United States Patent
Shirakawa

(10) Patent No.: US 9,621,794 B2
(45) Date of Patent: Apr. 11, 2017

(54) IMAGE PROCESSING DEVICE, IMAGE PROCESSING METHOD AND PERMANENT COMPUTER-READABLE MEDIUM

(71) Applicant: NEC Corporation, Minato-ku, Tokyo (JP)

(72) Inventor: Hirotsugu Shirakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/762,892

(22) PCT Filed: Feb. 4, 2014

(86) PCT No.: PCT/JP2014/000561
§ 371 (c)(1),
(2) Date: Jul. 23, 2015

(87) PCT Pub. No.: WO2014/129127
PCT Pub. Date: Aug. 28, 2014

(65) Prior Publication Data
US 2015/0373257 A1    Dec. 24, 2015

(30) Foreign Application Priority Data

Feb. 21, 2013 (JP) ................................. 2013-031805

(51) Int. Cl.
*H04N 5/232* (2006.01)
*G06F 3/048* (2013.01)
(Continued)

(52) U.S. Cl.
CPC ....... *H04N 5/23216* (2013.01); *G06F 3/0482* (2013.01); *G06F 3/04845* (2013.01);
(Continued)

(58) Field of Classification Search
CPC ........... H04N 5/23216; H04N 5/23296; H04N 5/23293; H04N 5/23212; G06F 3/04845; G06F 3/0482
See application file for complete search history.

(56) References Cited

U.S. PATENT DOCUMENTS

2007/0097089 A1* 5/2007 Battles ................ G06F 3/03547
345/173
2012/0027393 A1 2/2012 Tsuda et al.
(Continued)

FOREIGN PATENT DOCUMENTS

JP        2007-052795 A    3/2007
JP        2012-027408 A    2/2012
(Continued)

OTHER PUBLICATIONS

International Search Report for PCT Application No. PCT/JP2014/000561, mailed on Mar. 11, 2014.
(Continued)

*Primary Examiner* — Gevell Selby

(57) ABSTRACT

A storage portion stores (220) an image data and a distance data including a respective subject and a lens focus. A display (180) displays a display image based on the image data, and an operation regarding a depth of field and a focus position being performed. An image adjusting portion (320) detects a first operation and a second operation performed referring to the display (180), and adjusts a focus distance according to the first operation and the distance data as well as adjusts a depth of field according to the second operation and the distance data for the image data to generate the display image.

12 Claims, 12 Drawing Sheets

(51) Int. Cl.
*G06F 3/0482* (2013.01)
*G06F 3/0484* (2013.01)

(52) U.S. Cl.
CPC ..... *H04N 5/23212* (2013.01); *H04N 5/23293* (2013.01); *H04N 5/23296* (2013.01)

(56) References Cited

U.S. PATENT DOCUMENTS

| | | |
|---|---|---|
| 2012/0105590 A1 | 5/2012 | Fukumoto et al. |
| 2012/0194709 A1* | 8/2012 | Yokohata ........... H04N 5/23212 348/240.3 |
| 2012/0287329 A1 | 11/2012 | Yahata |
| 2014/0253760 A1* | 9/2014 | Watanabe .............. H04N 5/142 348/239 |

FOREIGN PATENT DOCUMENTS

| | | |
|---|---|---|
| JP | 2012-142918 A | 7/2012 |
| JP | 2012-147167 A | 8/2012 |
| JP | 2012-191376 A | 10/2012 |
| JP | 2013-009274 A | 1/2013 |

OTHER PUBLICATIONS

"Arayuru tokoroni kasikoi Camera" Nikkei-electronics (Aug. 20, 2012).
Extended European Search Report for EP Application No. EP14754488.6 dated on Aug. 19, 2016.

\* cited by examiner

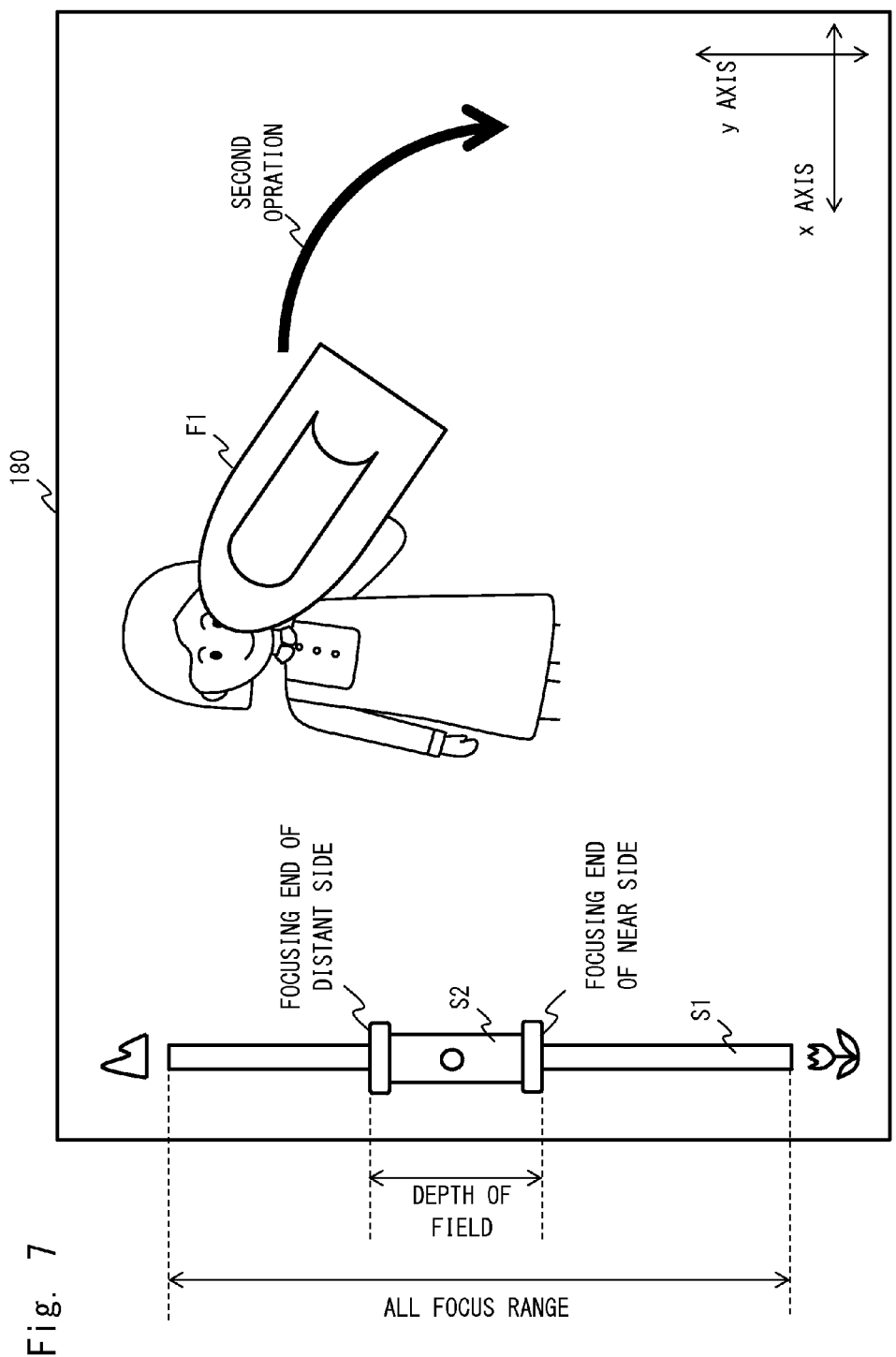

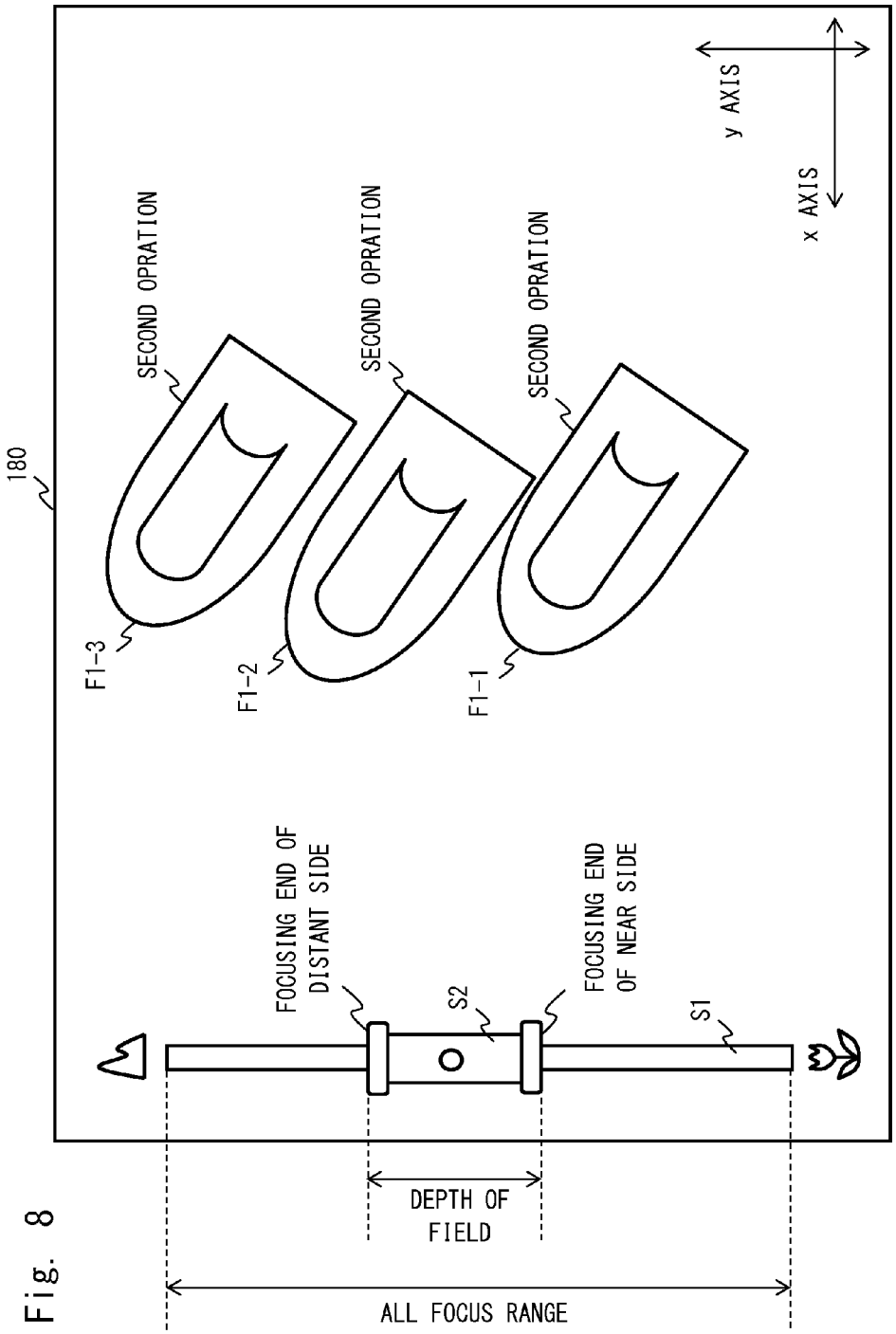

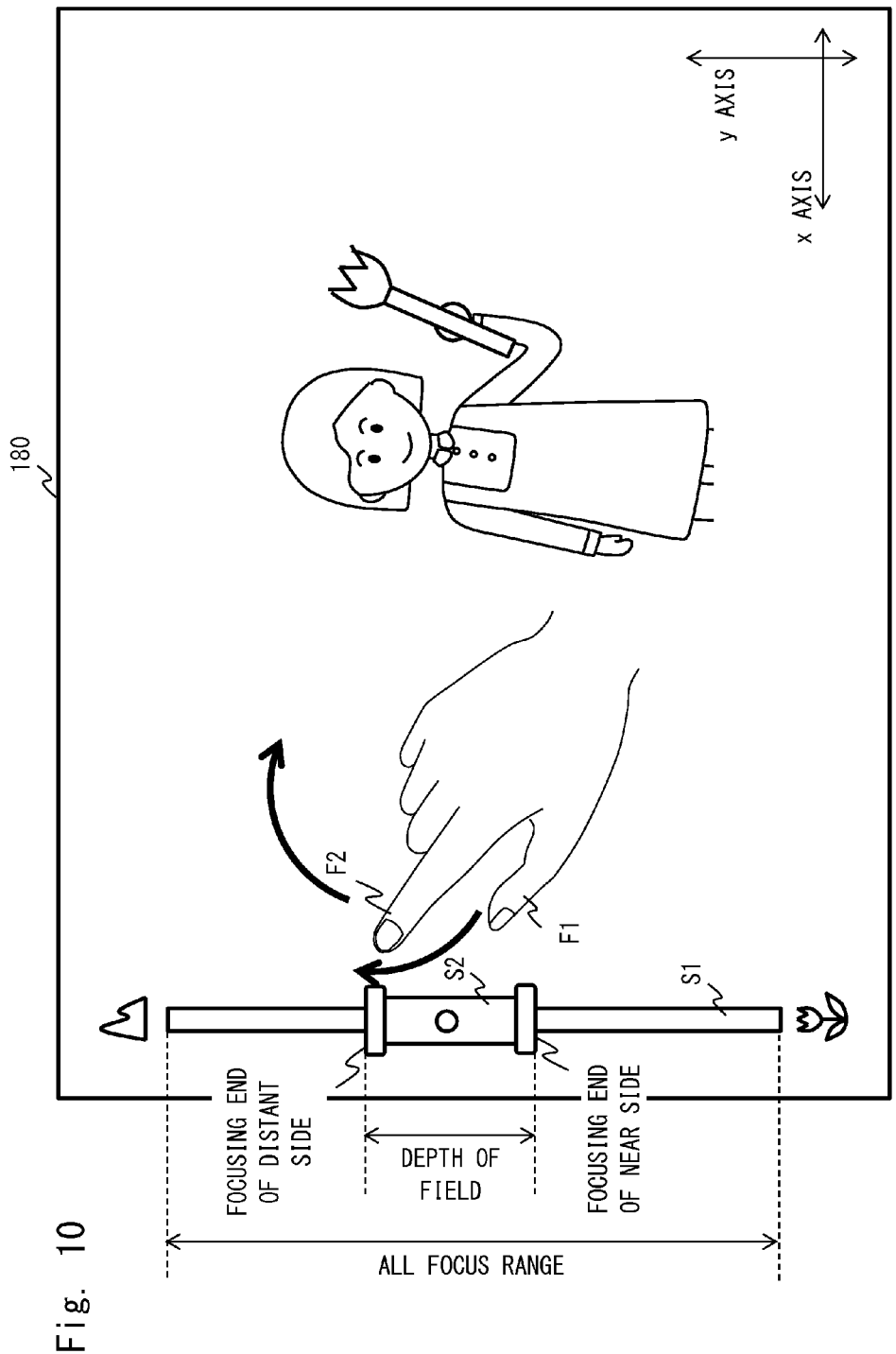

IMAGE PROCESSING DEVICE, IMAGE PROCESSING METHOD AND PERMANENT COMPUTER-READABLE MEDIUM

This application is a National Stage Entry of PCT/JP2014/000561 filed on Feb. 4, 2014, which claims priority from Japanese Patent Application 2013-031805 filed on Feb. 21, 2013, the contents of all of which are incorporated herein by reference, in their entirety.

TECHNICAL FIELD

The present invention relates to an image processing device, an image processing method, and a non-transitory computer readable media.

BACKGROUND ART

It is known that in a general single-lens reflex camera a depth of field can be varied by changing a stop of lens. However, in a small image pickup device such as a cellular phone and the like there is a case that the stop cannot be equipped due to a problem of cost or size.

Then, in recent years a technique which is called as a light field (light irradiating field) camera is gained attention. In the case of using the light field camera, a depth of field of image data can be changed after imaging. For example, the technique concerning the light field camera is described in patent literature 1 to patent literature 3 and the like. The light field camera is the technique of reconstructing the image data which is acquired by using a plenoptic camera to generate a refocused image data

CITATION LIST

Patent Literature patent literature 1: Japanese Unexamined Patent Application Publication No. 2012-191376
patent literature 2: Japanese Unexamined Patent Application Publication No. 2012-147167
patent literature 3: Japanese Unexamined Patent Application Publication No. 2012-142918

Non Patent Literature non patent literature 1: Nikkei-electronics 20 Aug. 2012, "arayuru tokoroni kasikoi Camera"

SUMMARY OF INVENTION

Technical Problem

In the field of the afore-mentioned light field camera, the technique to change the depth of field after imaging is generally used. However, it is not sufficiently considered by which kind of interface is used to set the depth of field or focus in changing the depth of field on the user side. Accordingly, the problem occurred that the image data in which the depth of field or focus is adequately set can not be rapidly obtained.

The present invention has been made to solve the above-mentioned problems, and has a main object to provide an image processing device, an image processing method, and a non-transitory computer readable media, which have an operation interface to adjust and operate a depth of field in addition to adjust a focus.

Solution to Problem

An aspect of an image processing device in accordance with the present invention is an image processing device comprising:
storage means for storing an image data including a distance data between a respective subject and a lens focus;
display means for displaying a display image based on the image data, and an operation regarding a depth of field and a focus position being performed; and
image adjusting means for detecting a first operation and a second operation performed referring to the display means, and adjusting a focus distance according to the first operation and the distance data as well as adjusting a depth of field according to the second operation and the distance data for the image data to generate the display image.

An aspect of an image processing method in accordance with the present invention is an image processing method comprising:
a display step of displaying a display image based on an image data including a distance data between a respective subject and a lens, and an operation regarding a depth of field and a focus position being performed; and
an image control step of detecting a first operation and a second operation performed referring to the display image, and adjusting a focus distance according to the first operation and the distance data as well as adjusting a depth of field according to the second operation and the distance data for the image data to generate the display image.

An aspect of an image processing method in accordance with the present invention is a non-transitory computer readable media for causing a computer to execute:
a step of reading out an image data including a distance data between a respective subject and a lens from a storage device; and an image control step of detecting a first operation and a second operation performed referring to the display of the display image based on the image data, and adjusting a focus distance according to the first operation and the distance data as well as adjusting a depth of field according to the second operation and the distance data for the image data to generate the display image.

Advantageous Effects of Invention

According to the present invention, it is possible to provide an image processing device, an image processing method, and a non-transitory computer readable media, which have an operation interface to adjust and operate a depth of field in addition to adjust a focus.

BRIEF DESCRIPTION OF DRAWINGS

FIG. 7 is a concept diagram showing an operation example of an image processing device 1 according to an exemplary embodiment 1;

FIG. 8 is a concept diagram showing an operation example of an image processing device 1 according to an exemplary embodiment 1;

FIG. 10 is a concept diagram showing an operation example of an image processing device 1 according to an exemplary embodiment 1;

DESCRIPTION OF EMBODIMENTS

Example 1

Figure 1:
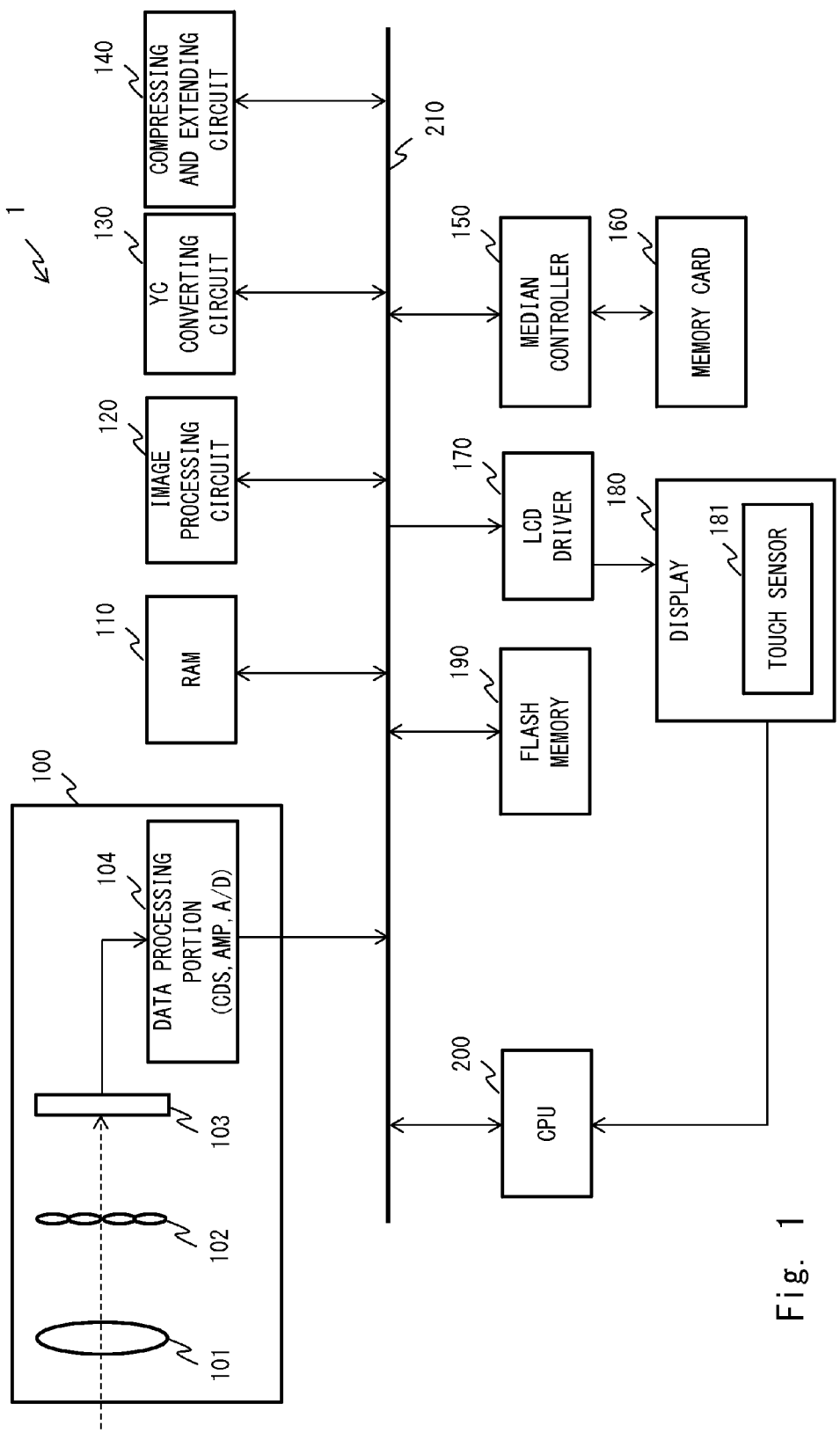
FIG. 1 is a block diagram showing a configuration of an image processing device 1 according to an exemplary embodiment 1.

Exemplary embodiments of the present invention will be described below with reference to the drawings. FIG. 1 is a block diagram showing a configuration of an image processing device according to an exemplary embodiment 1. Note that hereinafter image processing device is explained as a smart phone, however it is not necessarily limited to this. Image processing device 1 may be an optional terminal having an operation interface (operation portion) such as a touch panel and the like.

The image processing device 1 includes an image portion 100, RAM (Random Access memory) 110, an image processing circuit 120, a YC converting circuit 130, a compressing and extending circuit 140, a median controller 150, a memory card 160, a LCD driver 170, a display 180, a flash memory 190, CPU (Central Processing Unit) 200, and data bus 210.

The image portion 100 includes a lens 101, a micro array lens 102, a CCD (Charged Coupled Device) 103, and a data processing portion 104. The lens 101 is a main lens for imaging a subject. The micro array lens 102 is for example a plurality of micro lens which are two-dimensionally in a matrix disposed, and is disposed on an image formation face of the lens 101. Each of the micro lens whose plane shape, is a circle shape or a hexagon shape is constituted of a solid lens, a liquid crystal lens, a liquid lens, a diffraction lens and the like.

In the CCD 103 a plurality of light receiving elements for accumulating an electric charge according to light receiving amount entered as a light from the micro array lens 102 via its light receiving face is disposed. The CCD 103 outputs an electric charge which is accumulated in the respective light receiving element by imaging as an image signal. The micro array lens 102 is constituted of a plurality of micro lens. Accordingly, a physical distance between respective subject and lens focus (for example in case of imaging a child the physical distance between the position of the lens focus of the image portion 101 and the position of the child (10m)) can be obtained. Note that a CMOS (Complementary Metal-Oxide Semiconductor) may be used instead of the CCD 103. The data processing portion 104 is constituted of for example a CDS (Correlated Double Sampling), an amplifier, A/D (Analog/Digital) converter and the like, performs a general process in a general image device, and generates an image data including a distance between the respective subject within image range and the lens focus to store in RAM 110.

Note that the afore-mentioned constitution of the image portion 100 is an only exemplification. The constitution may be optional if image data which includes a distance between the respective subject within image range and the lens focus can be obtained. The constitution may be known lens module for realizing the structure of the light field camera. For example, the image portion 100 may include a lens for a right eye and a lens for a left eye, and may generate a parallax image data by the respective lens. Regarding the process of obtaining the distance data of the subject by the light field camera and the like, the structure is same as the structure described in non patent literature 1 and the like, accordingly, properly refer to it.

The image processing circuit 120 executes the process such as a gray scale conversion, a white balance correction, a gamma correction and the like. YC converting circuit 130 converts a data after imaging to a brightness signal Y and a color difference signal Cr, Cb. The compressing and extending circuit 140 compresses image data at an optional timing according to a predetermined compression format to write in an optional storage portion (for example memory card 160, flash memory 190).

The median controller 150 writes and read all sorts of data for the memory card 160. The memory card 160 is a storage portion in which data is read and written via the median controller 150. The memory card 160 is constituted to be capable of being attached and detached to the image processing device 1. The display 180 is driven by LCD driver 170. The LCD driver 170 converts image data which is read out from all sorts of storage portion (for example the memory card 160, the flash memory 190 and the like) and is performed digital processing by the CPU 200 to for example an analog signal in NSC (National Television System Committee) format, and outputs the converted an analog signal to the display 180.

The display 180 is provided on the front face of the image processing device 1 (smart phone). The display 180 is realized by a crystal display device, an organic EL (Electro Luminescence) display and the like, however it is not necessarily limited to this. The display 180 corresponds to a multi-touch such as a capacitance type, a resistance film type, an electromagnetic type and the like. The display 180 functions in an image mode as an electric view finder to display the image in real time. Further, the display 180 functions in a playback mode as a monitor to play back and display the image stored in all sorts storage (for example the memory card 160, the flash memory 190 and the like).

The display includes a touch sensor 181. The touch sensor 181 detects a contact position when a user's hand or finger contacts a display screen of the display 180. Then, the touch sensor 181 detects operations such as the so called pinch-in (an operation narrowing distance between two fingers), pinch-out (an operation widening distance between two fingers) and the like.

The flash memory 190 is a storage portion that stores all sorts of data (including image data). Note that the image processing device 1 properly includes a HDD (a hard disk drive) not shown as a storage portion.

CPU (Central Processing Unit) 200 is electrically connected to the respective processing portion in the image processing device 1 via the data bus 210. Data is inputted into the CPU 200 from all sorts of switches (for example a source switch) on the not-shown image processing device 1

(a smart phone in this example) and the afore-mentioned touch sensor 181. The CPU 200 reads out a program from all sorts of storage devices (the not-shown HDD, memory card 160, flash memory 190 and the like) and controls the respective processing portion as well as performs the process of generating a display image displayed on the display 180 from the image data and distance data generated by the image portion. The generating process of the display image will be in detail explained referring to FIG. 2.

Figure 2:
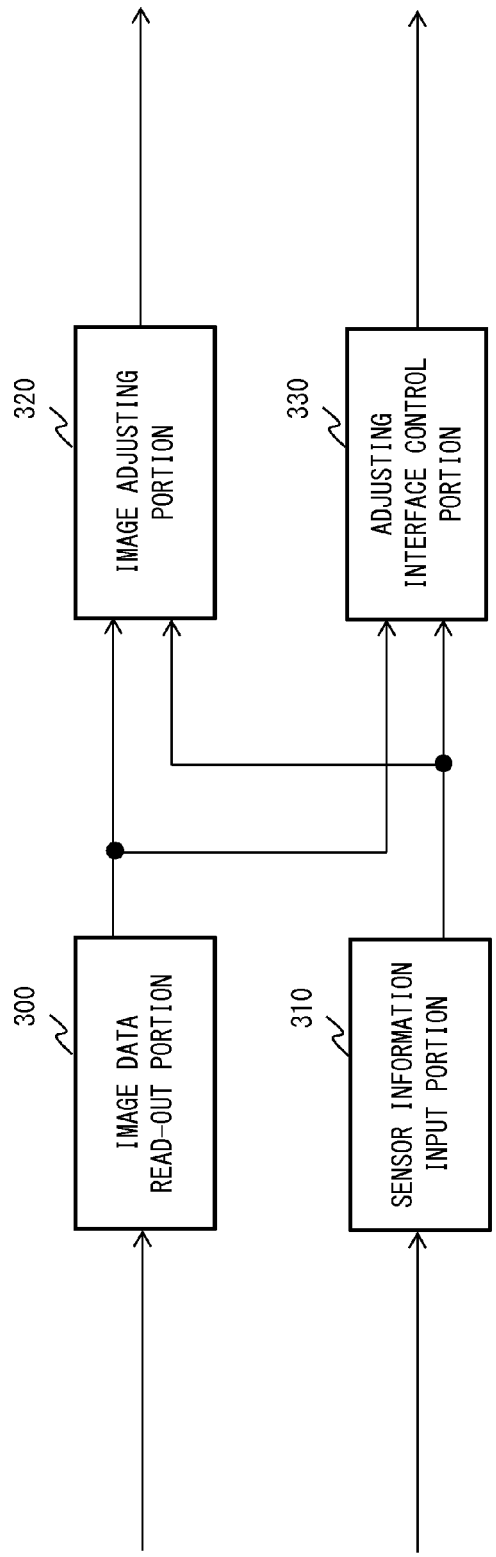
FIG. 2 is a block diagram schematically showing a control structure of an image processing device 1 according to an exemplary embodiment 1.

The control structure shown in FIG. 2 (an image data read-out portion 300, an sensor information input portion 310, an image adjusting portion 320, an adjusting interface control portion 330) is realized by executing a program by CPU 200.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The image data read-out portion 300 successively reads out the image data taken by the image portion 100 and stored in the respective storage portion (the memory card 160, flash memory 190, the not-shown hard disk and the like) and the distance data related with the image data. Then, the image data read-out portion 300 successively reads out the image data and the distance data in case that the image portion 100 takes a moving picture. The image data read-out portion 300 provides the read-out image data and distance data for the image adjusting portion 320 and the adjusting interface control portion 330.

The movement of the finger on the display 180 detected by the touch sensor 181 is inputted into the sensor information input portion 310. In detail, a direction of the display 180 (a direction of the display 180 acquired by the not-shown acceleration sensor), a position of a finger or a contact state of fingers (how many fingers contacts on the display 180), a movement distance of a finger, a movement direction are inputted into the sensor information input portion 310. The sensor information input portion 310 provides the acquired information of the movement of finger on the display 180 (the position of finger, the contact number of fingers, the movement distance of finger, the direction of the display 180) for the image adjusting portion 320 and the adjusting interface control portion 330.

The image adjusting portion 320 detects whether a first operation and a second operation is performed based on the movement distance of finger, the position of finger, and the movement direction of finger. The first operation is an operation to adjust a focus, and an example of the operation is later described referring to FIG. 3 and the like. The second operation is an operation to adjust a depth of field and an example of the operation is later described referring to FIG. 3 and the like.

The image adjusting portion 320 adjusts the focus of the image data read out by the image data read-out portion 300 according to the detection of the first operation to adjust the focus. In the adjustment the distance data read out by the image data read-out portion 300 is used. Then, the image adjusting portion 320 may adjust a focal distance (adjust a focal position) performed in a technique field of a general light field camera.

Furthermore, the image adjusting portion 320 adjusts the depth of field of the image data read out by the image data read-out portion 300 according to the detection of the second operation to adjust the depth of field. In the adjustment the distance data read out by the image data read-out portion 300 is used. Then, the image adjusting portion 320 may adjust a focal distance performed in a technique field of a general light field camera.

The adjusting interface control portion 330 detects whether a first operation and a second operation is performed based on the movement distance of finger, the position of finger, and the movement direction of finger. The adjusting interface control portion 330 controls the display of an adjusting interface (preferably a slide bar shown in FIG. 3) displayed on the display 180 according to the detection. As after-mentioned, the slide bar is displayed with overlapping on the display image.

Figure 3:
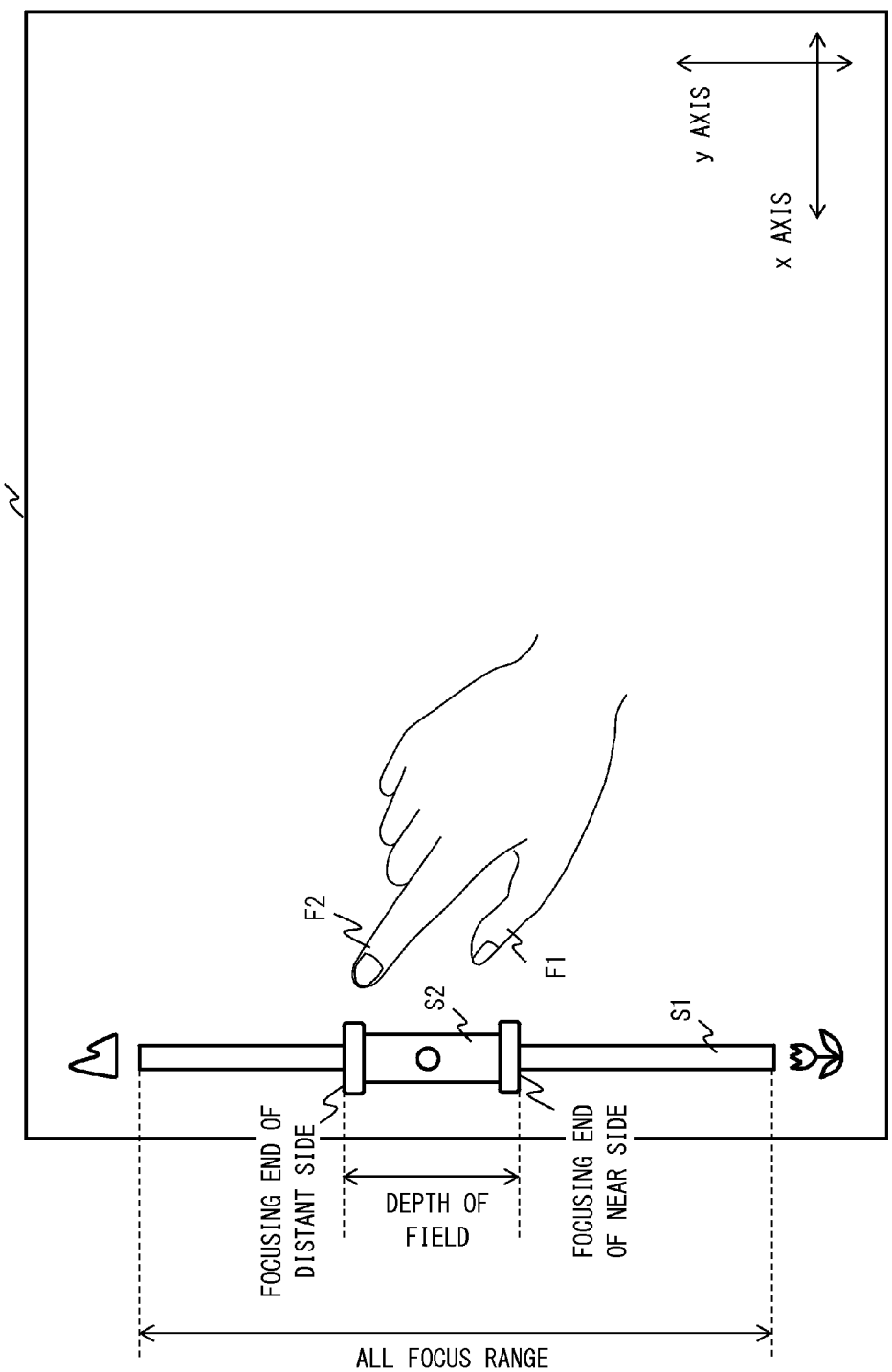
FIG. 3 is a concept diagram showing an operation example of an image processing device 1 according to an exemplary embodiment 1.

Next, the respective operation on the display 180 according to the exemplary embodiment. FIG. 3 is a concept diagram showing a operation example of the display 180. Nora that in the below explanation it is assumed that the display is operated by using a thumb and a forefinger of user's right hand, however any of ten fingers of both hands may be used.

The slide bar S1 is displayed on the display 180. The height length of the slide bar S1 indicates all focus range of the taken image data. An upper direction of the slide bar S1 indicates a distant side (Far) and a lower direction indicates this side (Near). In a knob S2 of the slide bar S1 an upper side indicates a focusing end of the distant side and a lower side indicates a focusing end of the near side.

In case user selects a reference mode (a mode for reading a taken image) of the image processing device, a live view scene appears on the display 180. The image processing device 1 have the afore-mentioned function of the light field camera and acquires the image data and the distance data of the image object and stores them in the storage device.

The adjusting interface control portion 330 displays the slide bar S1 on the display 180 with overlapping on the display image when the touch sensor 181 detects the contact of user's finger. As shown in the figure the slide bar S1 has a vertically long shape. Accordingly, in case the touch sensor 181 detects that user touches the right half of the screen, the adjusting interface control portion 330 displays the slide bar S1 on the right end of the display 180. On the other hand, in case the touch sensor 181 detects that user touches the left half of the screen, the adjusting interface control portion 330 displays the slide bar S1 on the left end of the display 180. In case the touch sensor 181 detects that user touches the approximate center portion of the screen in a horizontal direction, the adjusting interface control portion 330 displays the slide bar S1 on the right end of the display 180 considering there are many user with a right hand dominance. Note that the display position of the slide bar S1 may be displayed in the fixed position according to the settings set by user.

In case user widens a space between finger F1 and F2 in y axis direction (the so-called pinch-out), the image adjusting portion 320 and the adjusting interface control 330 detects the extension degree (the movement distance of the two fingers in y axis direction) according to input from the touch sensor 181. In the example of FIG. 3 the pinch-out (or the pinch-in) in y axis direction becomes the second operation to adjust the depth of field. The adjusting interface control portion 330 widens the width of the knob S2 according to the detected extension degree. The image adjusting portion 320 widens the focusing end of the distant side and the focusing end of the near side and changes the depth of field.

On the other hand, in case user narrows the space between finger F1 and F2 in y axis direction (the so-called pinch-in), the touch sensor 181 detects the reduction degree. The adjusting interface control portion 330 narrows the width of the knob S2 according to the detected reduction degree. The image adjusting portion 320 narrows the focusing end of the distant side and the focusing end of the near side and changes the depth of field. This is effective in case of wanting to display a gradating background with an only subject being focused.

In case the space of the user's fingers F1 and F2 is kept and fingers F1 and F2 slides in y axis direction, the touch sensor 181 detects the movement direction and the movement distance. In the example of FIG. 3, an operation to keep the space between two fingers F1 and F2 in y axis direction and move them is detected. The touch sensor 181 detects the movement degree. The adjusting interface control portion 330 moves the position of the knob S2 according to the detected movement degree. At this time, the width of the knob S2 (the length from the upper end to the lower end) is not changed. Further, the image adjusting portion adjusts the focus position by simultaneously adjusting the focus end of the distant side and the focus end of the near side according to the detected movement degree. That is, a manual focus operation is realized.

Note that the pinch-in (or the pinch-out) in x axis direction may be assigned to a general zoom process. Accordingly, a general zoom process can be realized and the depth of field and the focus position can be adjusted. Then the axis direction is an example. The pinch-in (the pinch-out) in x axis direction may be assigned to the adjustment of the depth of field (the second operation) (that is, the slide bar S1 may be extended and provided in x axis direction).

Figure 4:
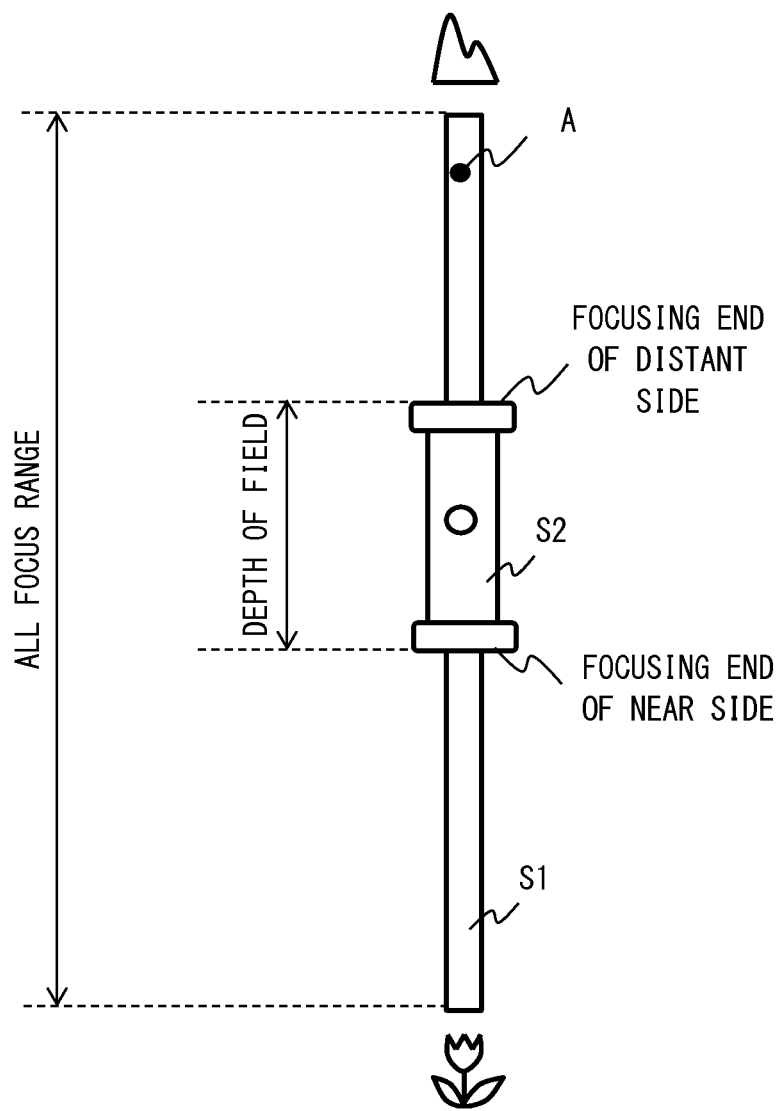
FIG. 4 is a diagram showing slide bar S1 displayed on display 180 according to an exemplary embodiment 1.
Figure 5:
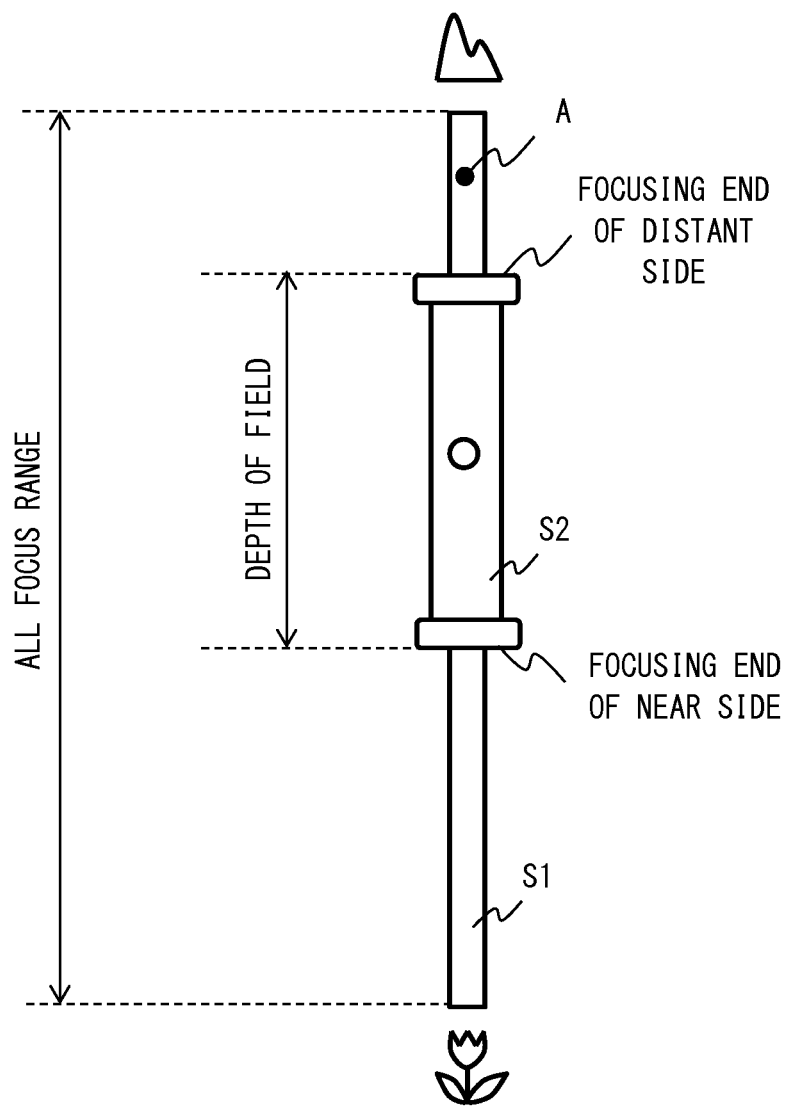
FIG. 5 is a diagram showing slide bar S1 displayed on display 180 according to an exemplary embodiment 1.

Note that the image adjusting portion 320 may adjust the so-called blur (Bokeh) according to the setting width of the depth of field. The specific example is explained referring to FIG. 4 and FIG. 5. FIG. 4 and FIG. 5 are a diagram showing slide bar S1 displayed on display 180 in displaying the same display image. The depth of field in the slide bar S1 shown in FIG. 4 is set to be narrower compared with the depth of field in the slide bar S1 shown in FIG. 5 That is, the width of area to be focused becomes small. With the setting width of the depth of field being smaller, the image adjusting portion 320 performs the image process such that the blur of the subject imaged outside the depth of field is stronger. For example, the blur of the subject imaged within A range of FIG. 4 is given more strongly than the blur of the subject imaged within A range of FIG. 5. Note that in the image process to give the blur a manner in a general digital image process may be used.

In a general single-lens reflex camera in the area outside the depth of field with being farther from the depth of field, the blur is stronger. Here, the strength of the blur in the single-lens reflex camera depends on a lens feature of the camera. For example, in the single-lens reflex camera Z the strength of the blur far from the area indicating the depth of field by 10$m$ is x. However, in the single-lens reflex camera W the strength of the blur far from the area indicating the depth of field by 10$m$ is 2x. Thus, they are different.

Therefore, the image adjusting portion 320 may have a plurality of tables regarding a manner to give the blur, and may adjust the strength of the blur by substituting the distance from the area of the depth of field for the table selected by user. The table is a table related with the distance from the area of the depth of field and the strength of the blur. The plurality of tables included in the image adjusting portion 320 may be a table corresponding to the lens of the existing respective single-lens reflex camera. Accordingly, even if an image data taken by the image portion 100 without a stop is displayed on the display 180, a display effect can be given in the same manner as a single-lens reflex camera which user usually uses.

Figure 6:
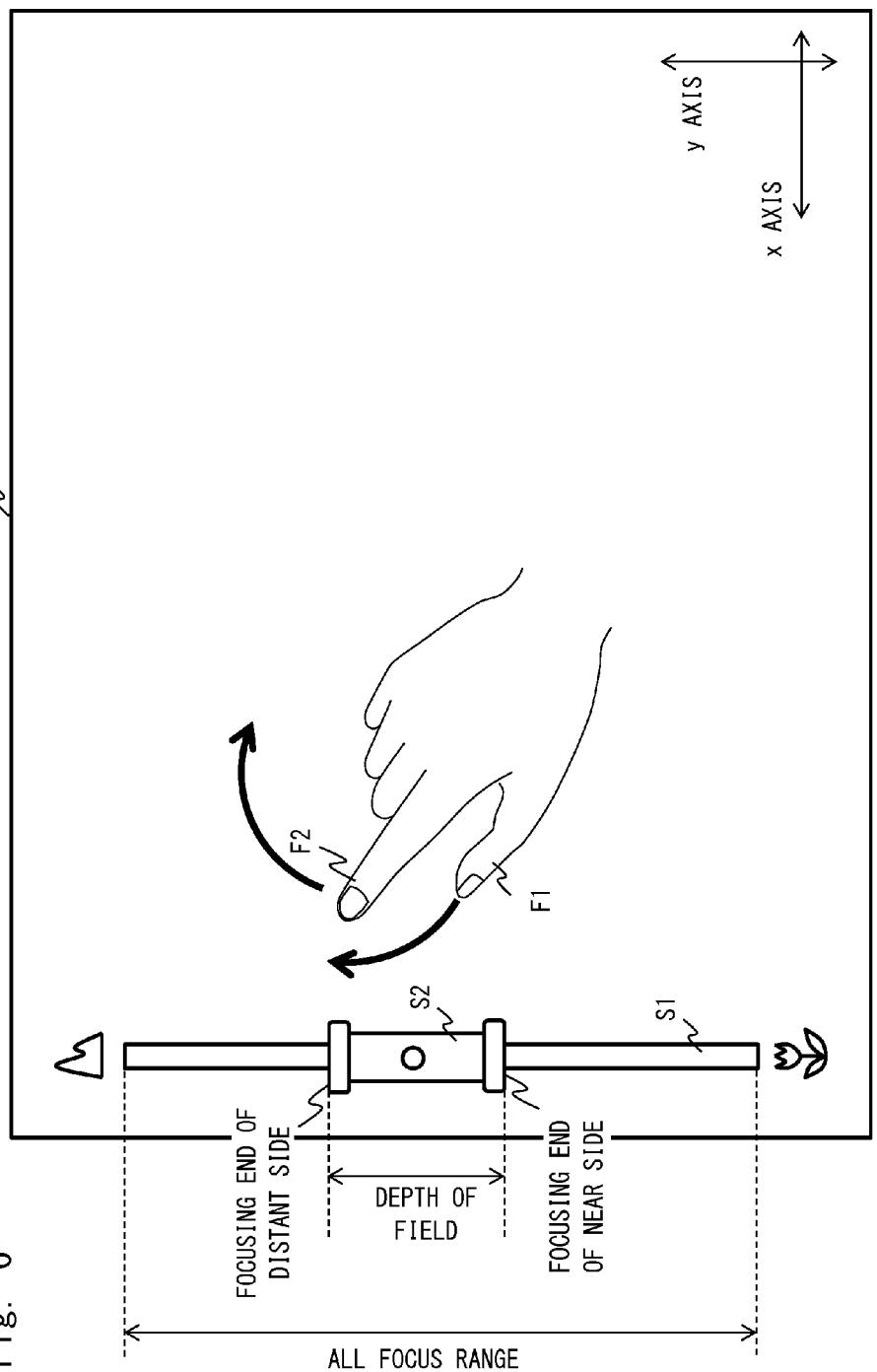
FIG. 6 is a concept diagram showing an operation example of an image processing device 1 according to an exemplary embodiment 1.

Next, referring to FIG. 6, it is a diagram showing a second operation example of the image processing device 1 according to the exemplary embodiment. In the second operation example, the rotation operation of fingers in a multi-touching state is assigned to the second operation (the adjustment operation of the depth of field).

In case user rotates fingers F1 and F2 (moving fingers F1 and F2 in arrow direction of FIG. 6), the touch sensor 181 detects the movement direction and movement distance. In case the fingers rotates clockwisely, the image adjusting portion 320 performs the image adjustment so that the depth of field becomes wider according to the movement distance. Meanwhile, in case the fingers rotates counterclockwisely, the image adjusting portion 320 performs the image adjustment so that the depth of field becomes narrower according to the movement distance. Further, the adjusting interface control portion 330 changes the size of the knob S2 according to the rotation width of fingers F1 and F2 by user. The rotation direction is a example. In case of rotating fingers counterclockwisely, it may be controlled so that the depth of field becomes wider.

As a third operation example, the example to set the depth of field and the focus position by using only one finger will be explained. A user longly pushes the subject to be focused in the image display with one finger F1. In the example of FIG. 7, the user longly pushes a face of a girl which is the subject. Then, the physical distance between the face of the girl and the lens focus is acquired by the afore-mentioned image portion 100 and stored in all sorts of storage portions. The image adjusting portion 320 and the adjusting interface control portion 330 detects this long push as the afore-mentioned first operation. Then, the image adjusting device 320 performs the image adjustment so that this position of the face of the girl is the focus position. Similarly, the adjusting interface control portion 330 adjusts the position of the knob S2 on the slide bar S1 according to the position of the face of this girl (the distance from lens).

Further, the image adjusting portion 320 and the adjusting interface control portion 330 detects the second operation according to the operation of one finger. For example, as shown in FIG. 7, the image adjusting portion 320 and the adjusting interface control portion 330 detects the operation drawing a circle as the second operation. In this case, the image adjusting portion 320 and the adjusting interface control portion 330 may adjust by widening the depth of field in detecting the clockwise operation and by narrowing the depth of field in detecting the counterclockwise operation.

Similarly, the depth of field and the focus position can also be set by using a pen device. In case of using the pen device, the image processing device 1 may detect the first operation (the operation of longly pushing on one point) and the second operation (the operation of drawing a circle) explained as the third operation example. The image processing device 1 can also detect the first operation and the second operation considering the push state of the button and the like which is provided with a pen-tablet.

Note that in case of using the pen-device, the image adjusting portion 320 may set the depth of field considering a thickness and the like of the pen point.

Next, referring to FIG. 8, a fourth setting example according to the depth of field and the focus position will be explained. To set the focus position, similarly to FIG. 7 (the third operation example), the long push is performed. A user successively pushes the subject of object (F1-1, F1-2, and F1-3 of FIG. 7) within a predetermined time interval. The physical distance between the respective subject position and the lens focus is acquired by the image portion 100 and stored in all sorts of storage portions as afore-mentioned. The image adjusting portion 320 and the adjusting interface control portion 330 recognizes among a plurality of the subjects (the subjects selected by F1-1 to F1-3) one between the shortest distance and the longest distance from lens as the depth of field. Then, the image adjusting portion 320 performs image adjustment according to the setting of the recognized depth of field. Simultaneously, the adjusting interface control portion 330 adjusts the width of the knob S2 on the slide bar S1 according to the setting of the recognized depth of field.

Next, referring to FIG. 9, the variation of setting methods of the focus position by the image adjusting portion 320 will be explained. FIG. 9 is a concept diagram showing the physical position and the focusing degree of the respective position regarding the focus position specified in the lens position of the image processing device 1 (a white circle portion in the figure) and the display 180.

Figure 9A:
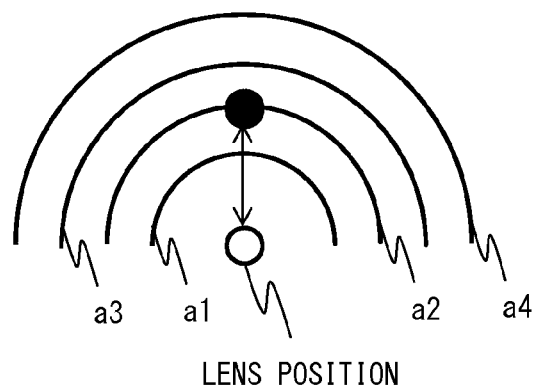
FIG. 9A is a concept diagram showing a focus position set according to an exemplary embodiment 1.

FIG. 9A is a concept diagram showing a first variation of the setting of the focus position. The image adjusting portion 320 calculates a distance between the physical position indicated by the touching position of the display 180 (the black circle portion in the figure) and the physical position of the lens of the image processing device 1 (the white circle position in the figure) from the distance data. Then, the image adjusting portion 320 performs image adjustment so that all of the points (the respective point of a2 in the figure) which is same distance as the distance are focused. That is, the image adjusting portion 320 performs image adjustment so that the focus position is not point but the respective point where the distance from the lens position is a predetermined distance is focused.

FIG. 9A is a concept diagram showing a first variation of the setting of the focus position. The image adjusting portion 320 calculates a distance between the physical position indicated by the touching position of the display 180 (the black circle portion in the figure) and the physical position of the lens of the image processing device 1 (the white circle position in the figure) from the distance data. Then, the image adjusting portion 320 performs image adjustment by defining one point of the physical position (the black circle in the figure) indicated by the touching position as a center of the focus position. That is, the image adjusting portion 320 performs image adjustment assuming the center of the focus position is one point.

Figure 9B:
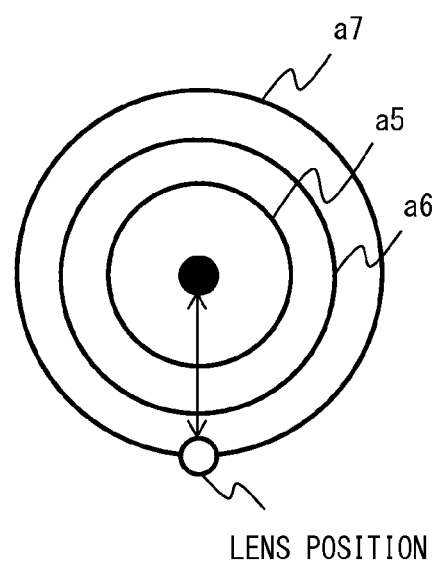
FIG. 9B is a concept diagram showing a focus position set according to an exemplary embodiment 1.
Figure 11:
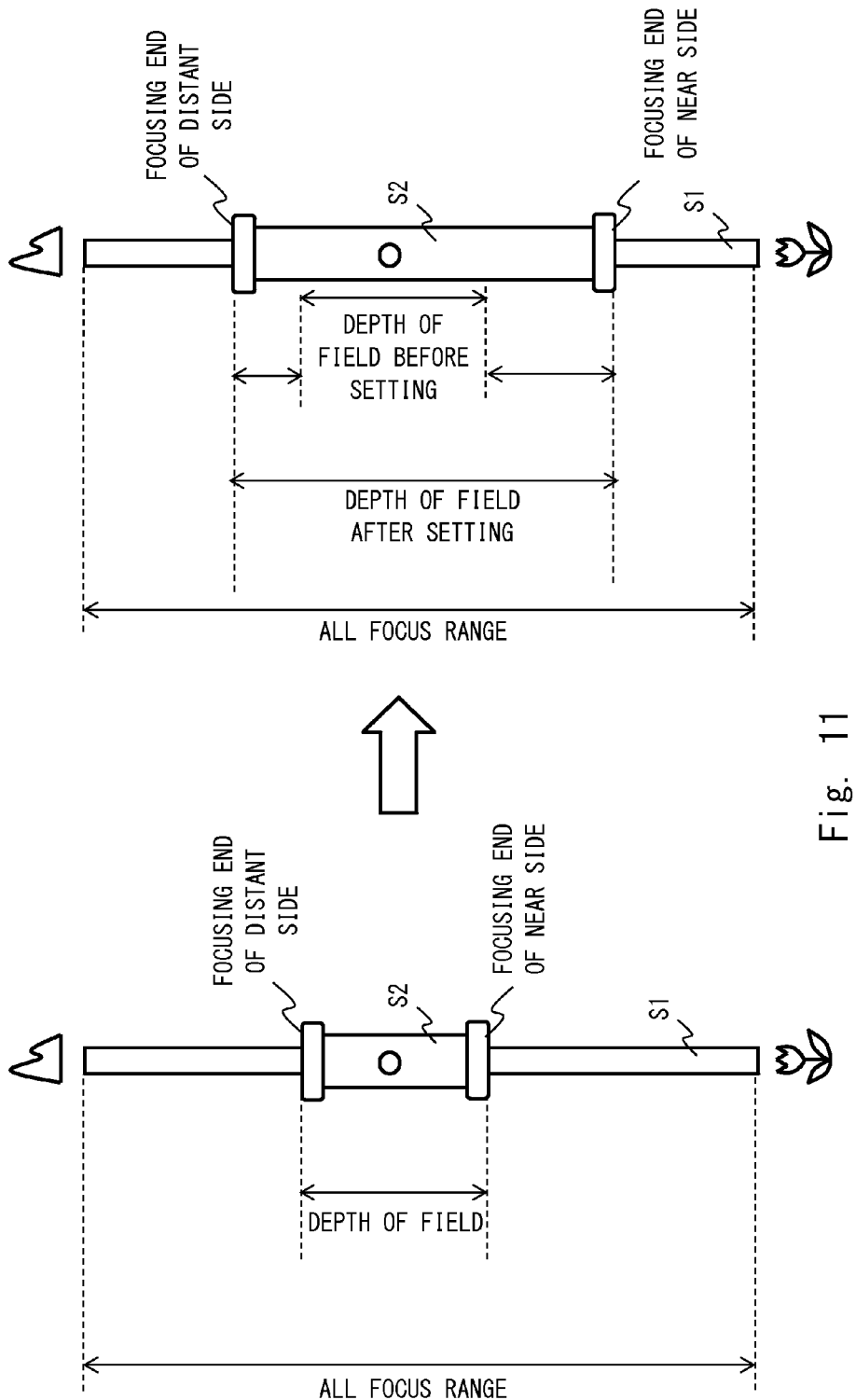
FIG. 11 is a diagram showing slide bar S1 displayed on display 180 according to an exemplary embodiment 1.

A user may select and use either the focus adjustment shown in FIG. 9(A) or the focus adjustment shown in FIG. 9(B) from a not-shown setting scene.

Note that in the above description the various operation example (the first operation to the fourth operation) is explained. However, the setting interface relating the operation with the setting contents may be displayed on the display 180, and a user may freely relate the respective setting contents (a zoom, a depth of field, a focus position and the like) with operation contents (e.g. the pinch-in (pinch-out) in x axis direction).

Further, the afore-mentioned operation example is an example to the end. The different operation may also be assigned as the first operation and the second operation. For example, the process of successively touching one point (a plurality of taps) may be assigned. That is, the different operation from a zoom may be assigned to the first operation or the second operation.

Next, the effect of the image processing device 1 according to the exemplary embodiment will be explained. The image processing device 1 according to the exemplary embodiment detects the first operation to adjust the focus position and the second operation to adjust the depth of field as afore-mentioned with the display image displayed on the display 180, and performs image adjustment with the constitution of the light field camera according to the operations. Accordingly, a user can adjust the focus distance and the depth of field by the intuitional operation while referring to the display image.

As shown in FIG. 3, the operation of performing a pinch-in or a pinch-out in a definite direction (y axis direction in FIG. 3) different from direction of the zoom is assigned to the second operation. Thereby, a user can set the depth of field by the operation different from the zoom (e.g. the pinch-in or the pinch-out in x axis direction). Further, the first operation and the second operation regarding the adjustment of the depth of field or the focus position are assigned to general pinch-in, pinch-out, movement of fingers and the like. Thereby, the setting of the focus position and the depth of field is facilitated for many users.

Further, as shown in FIG. 4, the operation of rotating fingers (moving in approximate circle direction) is assigned to the second operation. Thereby, a user can set the depth of field by the sensibly same operation as the stop adjustment.

Further, the image processing device 1 displays the slide bar S1 which is an adjustment interface on the display 180. Accordingly, the focus position and depth of field of the display image displayed at present can be rapidly grasped. Furthermore, the adjusting interface control portion 330 adjusts the display position of the slide bar S1 (a right end, a left end and the like) according to the touching position of a user. Accordingly, the slide bar S1 can be displayed at the position which is not an obstacle for a user.

In addition, the image processing device 1 changes the blur effect according to the width of the area of the depth of field as described referring to FIG. 4 and FIG. 5. Thereby, the same display effect as a general single-lens reflex camera can be realized.

The afore-mentioned exemplary embodiment is only an example regarding applications of a technique idea obtained by the inventor. That is, the technique idea is not limited to the only afore-mentioned exemplary embodiment, various changes may be performed.

Note that in the afore-mentioned explanation it is described that the image processing device 1 is a device including the image portion 100 (e.g. a smart phone, a digital camera and the like), however it is not limited to this. For example, the image processing device 1 may be a general personal computer. In this case, the image processing device 1 may be constituted to be able to download the image data (including the distance data) via an internet or read out the image data (including the distance data) from the attachable and detachable storage device (e.g. a USB (Universal Serial Bus) memory). A user performs the first operation and the second operation with a mouse referring to the display device (e.g. a liquid crystal display device) connected to a computer.

Furthermore, the image processing device 1 may be constituted to combine an auto focus function to focus a plurality of points with the afore-mentioned operations. Further, the display of the adjusting interface (S1) is necessarily not essential, it may not be displayed according to the user setting.

Further, in the setting of the depth of field, the movement distance of the focusing end of the near side may be different from the movement distance of the focusing end of the distant side. Referring to FIG. 10, it will be explained. FIG. 10 is a setting screen of the depth of field. In the example it is explained assuming that the depth of field is widened by the rotational operation of fingers.

In case of setting so that the depth of field becomes wider (e.g. in case of clockwisely rotating fingers), the image adjusting portion 320 and the adjusting interface control portion 330 detects the adjusting degree (the rotation degree of the fingers). Then, the image adjusting portion 320 and the adjusting interface control portion 330 perform adjustment so that the adjustment width (namely movement distance) of the focusing end of the near side is different from the adjustment width of the focusing end of the distant side. Referring to the slide bar S1 of FIG. 1, it is explained in detail.

In case of setting so that the depth of field becomes wider, the image adjusting portion 320 and the adjusting interface control portion 330 set the movement distance of the focusing end of the distant side to be wider than the movement distance of the focusing end of the near side. Thereby, as shown in FIG. 10 in case that a girl to be focused as a subject has a flower, the image in which the flower in addition to the girl to be the subject is clearly displayed can be obtained. Further, the blur of the distant side (namely a background) is stronger, the image having the novel blur sense and indicating the subject of the display object to be more three-dimensional (clearly) can be obtained.

Note that the image adjusting portion 320 and the adjusting interface control portion 330 perform image adjustment without changing the center of the depth of field (the position corresponding to the white circle of the slide bar S2) (For example, the girl is positioned at the center of the depth of field).

This method to give the blur sense can not be realized by a general single-lens reflex camera, thereby the novel image can be obtained. Note that the image adjusting portion 320 and the adjusting interface control portion 330 set the movement distance of the focusing end of the distant side to be narrower than the movement distance of the focusing end of the near side. The movement distance of the focusing end may be properly changed by the user setting.

Figure 12:
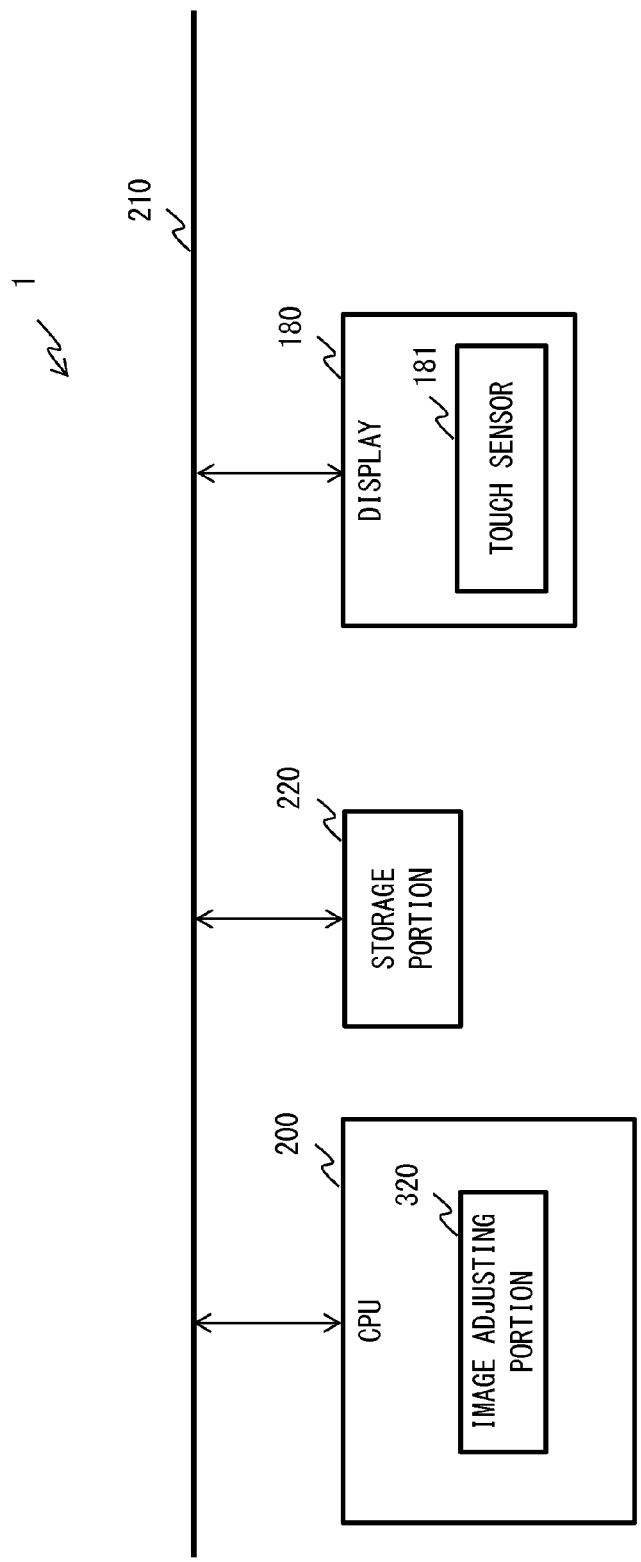
FIG. 12 is a block diagram showing a configuration of an image processing device 1 according the present invention.

Finally, referring to FIG. 12, the essential portion of the image processing device 1 according to the present invention will be explained again. FIG. 12 is a block diagram showing a summary of an image processing device 1 according the present invention. The storage portion 220 is a general term such as the flash memory 190, memory card 160, not-shown harddisk and the like according to FIG. 1, and stores the image data acquired by the image portion 100 (or an image device outside the image processing device 1) having the constitution of the light field camera. Further, the storage portion 220 stores the image data as well as the distance data between the respective subject and the lens focus.

The display 180 functions as a display portion to display the generated display image based on the image data. The display 180 has for example the touch sensor 181 and the first operation and the second operation regarding the depth of field and the focus position are performed.

The CPU 200 is an arithmetic device to control the image processing device 1, and reads out a program from the storage portion 200 and executes it. The CPU 200 operates as the image adjusting portion 320 by executing the program according to the control of the light field camera.

The image adjusting portion 320 detects the first operation and the second operation performed on the display 180. Then the image adjusting portion 320 reads out the image data and the distance data from the storage portion 220, and adjusts the focus position of the image data according to the first operation (e.g. the parallel movement of the fingers in a multi-touching state). Further, the image adjusting portion 320 adjusts the depth of field of the image data according to the second operation (e.g. the pinch-in or pinch-out in the multi-touching state). Accordingly, the image adjusting portion 320 generates the display image displayed on the display 180.

This constitution enables obtaining the display image in which the focus position or the depth of field is simply adjusted according to the operation on the display portion (the display 180).

While the invention has been particularly shown and described with reference to exemplary embodiments thereof, the invention is not limited to the afore-mention. It will be understood by those of ordinary skill in the art that various changes in form and details may be made therein without departing from the spirit and scope of the present invention as defined by the claims.

This application is based upon and claims the benefit of priority from Japanese patent application No. 2013-031805, filed on Feb. 21, 2013, the disclosure of which is incorporated herein in its entirety by reference.

REFERENCE SIGNS LIST

1 IMAGE PROCESSING DEVICE
100 IMAGE PORTION
110 RAM
120 IMAGE PROCESSING CIRCUIT
130 YC CONVERTING CIRCUIT
140 COMPRESSING AND EXTENDING CIRCUIT
150 MEDIAN CONTROLLER
160 MEMORY CARD
170 LCD DRIVER
180 DISPLAY
181 TOUCH SENSOR
190 FLASH MEMORY
200 CPU
210 DATA BUS
220 STORAGE PORTION
300 IMAGE DATA READ-OUT PORTION
310 SENSOR INFORMATION INPUT PORTION
320 IMAGE ADJUSTING PORTION
330 ADJUSTING INTERFACE CONTROL PORTION

The invention claimed is:

1. A image processing device comprising:
   a storage portion for storing an image data including a distance data between a respective subject and a lens focus;
   a display for displaying a display image based on the image data, and an operation regarding a depth of field and a focus position being performed; and an image adjusting portion for detecting a first operation and a second operation performed referring to the display, and adjusting a focus distance according to the first operation and the distance data as well as adjusting a depth of field according to the second operation and the distance data for the image data to generate the display image, wherein the display includes a touch sensor that detects a contact of a user's finger or all sorts of devices, and is a touch display that displays the display image, and the first operation is an operation of moving user's fingers in a predetermined direction without keeping apart from the touch display while the space between user's two fingers are kept to be approximately same, or an operation of pushing the subject for not less than a predetermined time in displaying the display image.

2. The image processing device according to claim 1, wherein the second operation is an operation of widening or narrowing the space between user's two fingers in a predetermined direction while user's fingers are contact with the touch display.

3. The image processing device according to claim 1, wherein the second operation is an operation of moving in an approximate circle direction while user's one finger or two fingers is contact with the touch display.

4. The image processing device according to claim 1, wherein the second operation is an operation of touching the touch display several times within a predetermined time interval in displaying the display image.

5. The image processing device according to claim 1, further comprising an adjusting display control portion for displaying an adjusting interface indicating a setting degree of the focus position and the depth of field of the display image on the touch display based on the first operation and the second operation performed for the touch display.

6. The image processing device according to claim 5, wherein the adjusting display control portion changes the display position of the adjusting interface on the touch display according to the contact position of user's fingers on the touch display detected by the touch sensor.

7. The image processing device according to claim 6, wherein the adjusting display control portion displays the display position of the adjusting interface on the touch display from the center to the right area of the touch display in case that the contact position of user's fingers on the touch display detected by the touch sensor is a predetermined center area.

8. The image processing device according to claim 1, wherein the image adjusting portion adjusts for the image data the depth of field according to the second operation and the distance data as well as gives a blur effect based on a size of an area of the depth of field and a physical distance from the area, to the subject outside the area of the depth of field.

9. The image processing device according to claim 1, wherein on adjusting for the image data the depth of field according to the second operation and the distance data, the image adjusting portion adjusts it so that the movement distance of the focusing end of the near side is different from the movement distance of the focusing end of the distant side.

10. The image processing device according to claim 9, wherein on adjusting for the image data the depth of field according to the second operation and the distance data, the image adjusting portion adjusts it so that the movement distance of the focusing end of the near side becomes narrower than the movement distance of the focusing end of the distant side.

11. A image processing method comprising:

a display step of displaying a display image on a display based on an image data including a distance data between a respective subject and a lens, and an operation regarding a depth of field and a focus position being performed; and an image control step of detecting a first operation and a second operation performed referring to the display image, and adjusting a focus distance according to the first operation and the distance data as well as adjusting a depth of field according to the second operation and the distance data for the image data to generate the display image, wherein the display includes a touch sensor that detects a contact of a user's finger or all sorts of devices, and is a touch display that displays the display image, and the first operation is an operation of moving user's fingers in a predetermined direction without keeping apart from the touch display while the space between user's two fingers are kept to be approximately same, or an operation of pushing the subject for not less than a predetermined time in displaying the display image.

12. A non-transitory computer readable media for causing a computer to execute:

a step of reading out an image data including a distance data between a respective subject and a lens from a storage device; and an image control step of detecting a first operation and a second operation performed referring to the display of the display image on a display based on the image data, and adjusting a focus distance according to the first operation and the distance data as well as adjusting a depth of field according to the second operation and the distance data for the image data to generate the display image, wherein the display includes a touch sensor that detects a contact of a user's finger or all sorts of devices, and is a touch display that displays the display image, and the first operation is an operation of moving user's fingers in a predetermined direction without keeping apart from the touch display while the space between user's two fingers are kept to be approximately same, or an operation of pushing the subject for not less than a predetermined time in displaying the display image.

* * * * *